No. 850,025. PATENTED APR. 9, 1907.
G. E. & J. A. LILE.
HARNESS PLOW ATTACHMENT.
APPLICATION FILED JUNE 21, 1906.
Fig. 1.
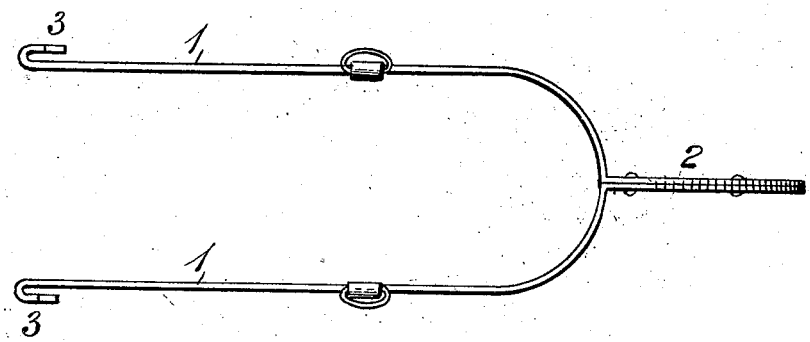
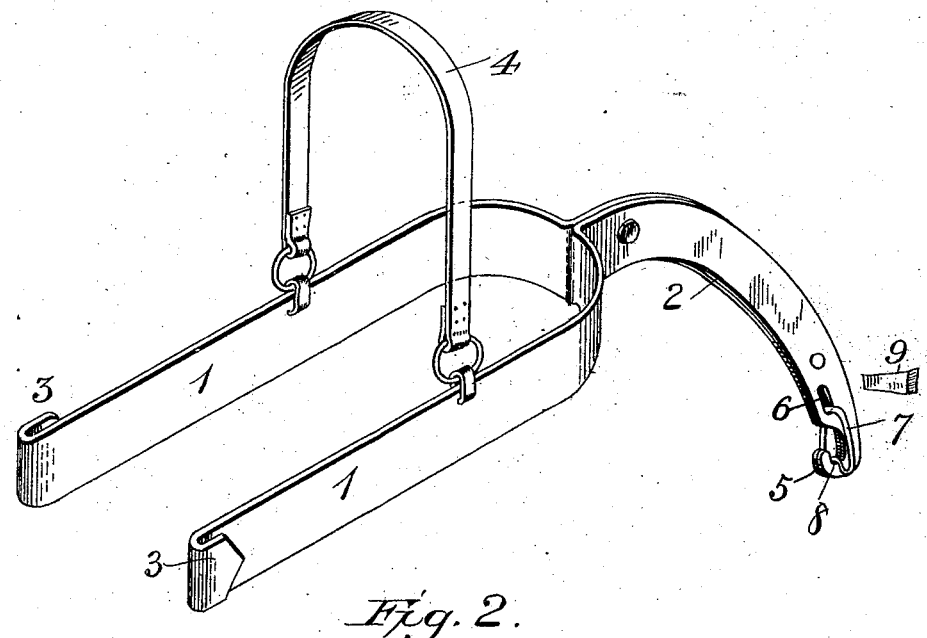
Fig. 2.
Inventors:
George E. Lile,
Joseph A. Lile,

UNITED STATES PATENT OFFICE.

GEORGE E. LILE AND JOSEPH A. LILE, OF CLOVERDALE, CALIFORNIA.

HARNESS PLOW ATTACHMENT.

No. 850,025.      Specification of Letters Patent.      Patented April 9, 1907.

Application filed June 21, 1906. Serial No. 322,783.

*To all whom it may concern:*

Be it known that we, GEORGE E. LILE and JOSEPH A. LILE, citizens of the United States, residing at Cloverdale, in the county of Sonoma and State of California, have invented certain new and useful Improvements in Harness Plow Attachments, of which the following is a specification.

Our invention pertains to improvements in harness plow attachments. Its object is to provide more especially for plowing or cultivating vineyards, nurseries, and other small bushes and vegetables, also to dispense with the use of the swingletree for plowing or cultivating anything which the same would be liable to catch into or scratch or bruise.

Said invention consists of certain structural features or instrumentalities substantially as hereinafter fully disclosed, and specifically pointed out by the claims.

In the accompanying drawings, illustrating the preferred embodiment of our invention, Figure 1 is a plan view thereof, and Fig. 2 is a perspective view of the same with a strap attached thereto for balancing it when in practical use.

In the disclosure of our invention we form of a single piece of suitable metal or steel what may be called, for a better name, a "frame," the two arms 1 thereof being curved or branching off laterally from their point of juncture or union with a downward and rearward curved or inclined portion 2. Said rear end depending portion is about half an inch thick and about three inches wide, and from this part the lateral portions or arms are gradually thinned toward their forward ends, where they are formed into hooks, into the requisite lightness for the purposes of this invention, as will be readily appreciated. Said lateral portions or arms 1 serve practically in the capacity of traces without the attendant limpness thereof or as thills or other usual draft appliances, but standing throughout their lengths in a plane much above that of the latter and reaching forward and effecting connection with the hames, said arms having forward end hook formations or terminals 3 for engagement with the slots in the rear ends of the usual tug-buckles on said hames. (Not shown.) To said arms is suitably attached a strap 4 for passing over the back of the horse just forward of the hips for balancing in position the frame when detached from the plow or cultivator.

The depending rear end portion 2 of the contrivance has a hook-shaped lower end 5 for suitably engaging or attaching it to the forward end of the cultivator or plow beam. (Not shown.) Also loosely suspended in a vertical slot 6 in said depending portion 2 is a link or latch 7, itself having an infolded or bent lower end forming practically a slot 8 therein. With the hook 5 of the part 2 engaging the usual draft attaching ring or clevis of the plow or cultivator beam the link or latch 7 is adjusted so as to cause it to fit over the hook-engaged portion of said ring and downward laterally of said hook 5, when if it may not be desired to depend upon the weight or gravity of the latch for its retention in effective position a wedge or key 9 may be inserted into the unoccupied portion of the slot 6 in the part 2 above said link or latch for that purpose.

It will be noted that in the use of this contrivance the usual whiffletree or swingletree is dispensed with, which would be objectionable for the reasons above recited, and that connection may be effected with the plow or cultivator beam low down near the surface below the shrubbery, while the arms or lateral members standing in a plane above the shrubbery the latter will not be interfered with thereby in the plowing or cultivating operation, as desired.

We claim—

1. A device of the character described, having a downward extended or curved rear end portion, equipped with means for attaching the same to a plow or cultivator beam, and arms extended or curved laterally outward from said rear end portion and forward and provided with means for their attachment to the hames.

2. A device of the character described, having a downward extended or curved rear end portion provided with a hook-ended terminal, and with a link or latch for coöperation with said hook-ended terminal, and arms extending or curving laterally outward from said rear end portion and then forward and terminating at their forward ends into hooks for engaging the usual tug hooks or buckles on the hames.

In testimony whereof we have signed our names to this specification in the presence of two subscribing witnesses.

GEORGE E. LILE.
     JOSEPH A. LILE.

Witnesses:
 C. T. COFFEY,
 M. I. DUNN.